United States Patent
Ramakrishnan et al.

(10) Patent No.: US 12,013,678 B2
(45) Date of Patent: Jun. 18, 2024

(54) BACKLASH COMPENSATION IN MOTION CONTROL SYSTEMS

(71) Applicant: Siemens Healthcare Diagnostics Inc., Tarrytown, NY (US)

(72) Inventors: Narayanan Ramakrishnan, New City, NY (US); Omar Khalaf, Tarrytown, NY (US); David G. Henderson, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 152 days.

(21) Appl. No.: 17/758,871

(22) PCT Filed: Jan. 15, 2021

(86) PCT No.: PCT/US2021/013670
§ 371 (c)(1),
(2) Date: Jul. 14, 2022

(87) PCT Pub. No.: WO2021/146578
PCT Pub. Date: Jul. 22, 2021

(65) Prior Publication Data
US 2023/0041248 A1 Feb. 9, 2023

Related U.S. Application Data

(60) Provisional application No. 62/962,854, filed on Jan. 17, 2020.

(51) Int. Cl.
*G05B 19/404* (2006.01)
*H02P 8/00* (2006.01)

(52) U.S. Cl.
CPC .............. *G05B 19/404* (2013.01); *H02P 8/00* (2013.01); *G05B 2219/41078* (2013.01); *G05B 2219/41209* (2013.01)

(58) Field of Classification Search
CPC ....... B25J 9/1641; B25J 9/1692; F16H 57/00; G05B 19/404; G05B 2219/41078;
(Continued)

(56) References Cited

U.S. PATENT DOCUMENTS

| 4,962,583 A | 10/1990 | Yang |
| 5,374,883 A | 12/1994 | Morser |

(Continued)

FOREIGN PATENT DOCUMENTS

| JP | H11-237920 A | 8/1999 |
| JP | 2002-11854 A | 1/2002 |

(Continued)

OTHER PUBLICATIONS

PCT International Search Report and Written Opinion dated Apr. 8, 2021 (9 Pages).

(Continued)

*Primary Examiner* — Antony M Paul

(57) ABSTRACT

A method for backlash compensation in motion control systems includes homing a payload of a motion control system, and performing a tooth-pitch non-uniformity procedure on the motion control system to identify a non-uniformity correction. A backlash lookup table is generated for use in backlash correction during normal operation of the motion control system. The backlash lookup table is generated using a training process that includes selecting a move sequence for operating the motion control system, and executing the move sequence with the non-uniformity correction. The training process further includes computing a backlash measurement describing backlash of one or more components of the motion control system during the move sequence, and storing the backlash measurement in the backlash lookup table.

22 Claims, 14 Drawing Sheets

(58) Field of Classification Search
CPC ... G05B 2219/41209; H02P 5/00; H02P 8/00; H02P 17/00; H02P 5/69; H02P 5/68; H02P 5/695; H02P 5/747; H02P 5/753; H02P 6/006; H02P 8/005; H02P 25/06; H02P 29/028
See application file for complete search history.

(56) References Cited

U.S. PATENT DOCUMENTS

| | | | |
|---|---|---|---|
| 6,611,823 | B1 | 8/2003 | Selmic et al. |
| 6,865,499 | B2 | 3/2005 | Yutkowitz |
| 7,080,055 | B2 | 7/2006 | Campos et al. |
| 8,265,779 | B2 | 9/2012 | Hagglund |
| 9,228,909 | B1 | 1/2016 | Rembisz et al. |
| 2014/0039666 | A1 | 2/2014 | Hong |
| 2014/0134927 | A1 | 5/2014 | Walsh et al. |
| 2017/0300033 | A1 | 10/2017 | Hashimoto et al. |
| 2018/0126552 | A1* | 5/2018 | Jonsson ............... G05B 19/401 |
| 2018/0249604 | A1 | 8/2018 | Komiyama et al. |
| 2018/0293498 | A1 | 10/2018 | Campos et al. |
| 2018/0373223 | A1 | 12/2018 | Ikai et al. |

FOREIGN PATENT DOCUMENTS

| | | |
|---|---|---|
| JP | 2006-292498 A | 10/2006 |
| JP | 2007-10608 A | 1/2007 |
| JP | 2017-11814 A | 1/2017 |

OTHER PUBLICATIONS

Extended EP Search Report dated Jun. 5, 2023 of corresponding European Application No. 21740959.8, 4 Pages.

* cited by examiner

| Set No | Upper limit of segment range (simulated) | Real Steps / Lower limit of range | Real Steps / Upper limit of range | Real velocity | Real accel | Real jerk during accel | Real deccel | Real jerk during deccel |
|---|---|---|---|---|---|---|---|---|
| 1 | 102400 | 87772 | 102400 | 189951 | 1272 | 27 | 294 | 7 |
| 2 | 102400 | 87772 | 102400 | 202089 | 1304 | 23 | 294 | 4 |
| 3 | | | | | | | | |
| 4 | 102400 | 87772 | 102400 | 195570 | 1630 | 17 | 326 | 4 |
| 5 | 102400 | 87772 | 102400 | 189951 | 1630 | 14 | 326 | 5 |
| 6 | 102400 | 87772 | 102400 | 195570 | 1630 | 14 | 326 | 7 |
| 7 | 102400 | 87772 | 102400 | 191235 | 1417 | 12 | 306 | 8 |
| 8 | | | | | | | | |
| 9 | 102400 | 87772 | 102400 | 195570 | 1630 | 14 | 326 | 2 |
| 10 | 102400 | 87772 | 102400 | 195570 | 1630 | 14 | 326 | 14 |

BACKLASH COMPENSATION IN MOTION CONTROL SYSTEMS

CROSS REFERENCE TO RELATED APPLICATION

This application claims the benefit of U.S. Provisional Patent Application No. 62/962,854, entitled "BACKLASH COMPENSATION IN MOTION CONTROL SYSTEMS" filed Jan. 17, 2020, the disclosure of which is hereby incorporated by reference in its entirety for all purposes.

TECHNICAL FIELD

The present invention relates generally to systems, methods, and apparatuses related to methods for backlash compensation in motion control systems. The techniques described herein may be applied to, for example, timing belt-based drive systems.

BACKGROUND

In motion control systems, the term "backlash" refers to the clearance or lost motion in a mechanism caused by gaps between mating components such as gears. For precision motion control systems that require bi-directional motion along one or more spatial axes, backlash present in the system could result in significant positioning and motion-tracking errors. Further, in certain cases, backlash can induce instabilities during motion. A major source of positioning error is mechanical "play" in the transmission. The factors involved include nominal clearance between mating teeth, tooth-pitch non-uniformities on the timing belt-pulley(s), chain-drive or gear-drive train as well as elastic (or viscoelastic) deformations of the drive train components. Mitigation of these errors is critical in most precision motion control systems.

Timing belt-based drive systems can exhibit backlash mostly due to nominal clearance (if any) between mating teeth/groves, non-uniformity of tooth-pitch on the pulleys and belt as well as due to mechanical play in the bearings and other drive system components. Tooth deformation and belt cord stretching and relaxation effects due to friction and viscoelastic properties of the materials may also contribute to backlash. Backlash on these systems can be reduced by selecting higher-precision pulleys, belts, bearings and other drive-train components that maintain tighter tolerances on the geometric parameters and made of materials that result in reduced tooth deformation. Backlash post-compensation can also be implemented by sensing incremental motion or absolute positioning of the payload. However, these solutions would generally entail a higher overall cost and complexity of the drive system and may still result in backlash-induced motion errors that exceed limits set by performance requirements. Alternatively, feedback control of the payload motion could be implemented which again would result in additional cost as well as complexity of the drive system. Similar considerations apply also to drive transmissions such as gear-drives, chains, lead-screw, etc.

SUMMARY

Embodiments of the present invention address and overcome one or more of the above shortcomings and drawbacks, by providing methods, systems, and apparatuses related to backlash compensation in motion control systems.

According to some embodiments, a method for backlash compensation in motion control systems includes homing a payload of a motion control system, and performing a tooth-pitch non-uniformity procedure on the motion control system to identify a non-uniformity correction. A backlash lookup table is generated for use in backlash correction during normal operation of the motion control system. The backlash lookup table is generated using a training process that includes selecting a move sequence for operating the motion control system, and executing the move sequence with the non-uniformity correction. The training process further includes computing a backlash measurement describing backlash of one or more components of the motion control system during the move sequence, and storing the backlash measurement in the backlash lookup table.

According to other embodiments, a method for backlash compensation in motion control systems includes homing a payload of a motion control system, and performing a tooth-pitch non-uniformity procedure on the motion control system to identify a non-uniformity correction. Backlash measurements are computed corresponding to a plurality of move sequences. Each backlash measurement is computed using a process that includes selecting a move sequence for operating the motion control system, executing the move sequence with the non-uniformity correction. The process further includes computing a backlash measurement describing backlash of one or more components of the motion control system during the move sequence, and storing the backlash measurement and the move sequence. A machine learning model is trained for use in backlash correction using the plurality of backlash measurements and the plurality of move sequences.

According to other embodiments, a method for backlash compensation in motion control systems includes performing a correction process during normal operation of a motion control system. This correction process includes receiving a request to execute a new move sequence. If the new move sequence includes a direction reversal for the motion control system, a new backlash correction is estimated using a backlash lookup table and the new backlash is applied to correct the new move sequence. Then, the new move sequence is executed.

According to other embodiments, a method for backlash compensation in motion control systems includes performing a correction process during normal operation of a motion control system. This correction process includes receiving a request to execute a new move sequence. If the new move sequence includes a direction reversal for the motion control system, a new backlash correction is estimated using a machine learning model and the new backlash correction is applied to the new move sequence. The new move sequence is then executed. The machine learning model is trained by measuring backlash of the motion control system when executing a training sequence of moves.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, the drawings show embodiments that are presently preferred, it being understood, however, that the invention is not limited to the specific instrumentalities disclosed. Included in the drawings are the following Figures.

DETAILED DESCRIPTION

Figure 1:
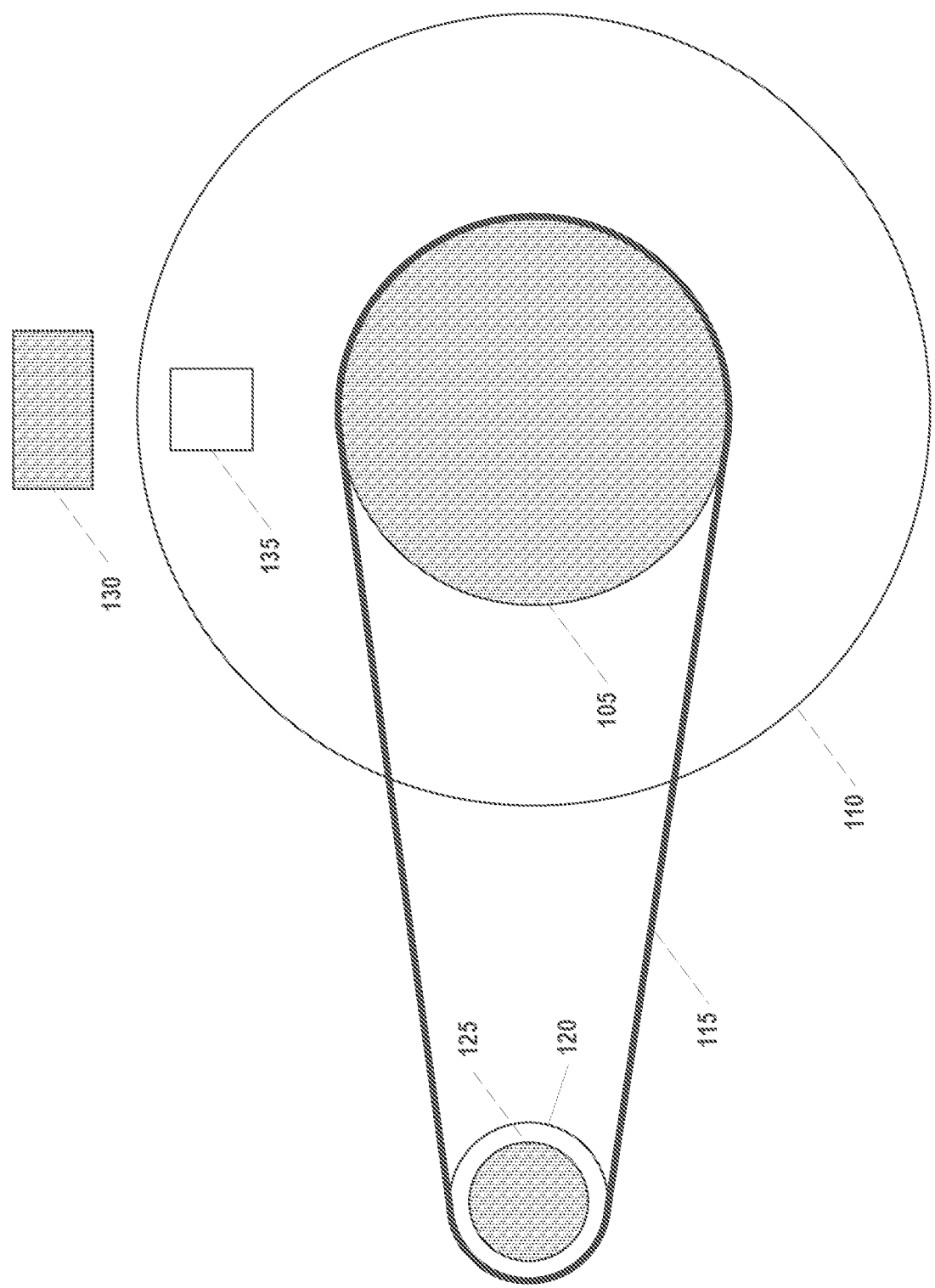
FIG. 1 shows a belt-drive system driven by a rotary motor, as may be used in some embodiments.

The present invention relates generally to methods, systems, and apparatuses related to a learning-based method for backlash compensation in motion control systems. Backlash in drive transmissions is primarily due to deterministic factors such as those mentioned above, and mostly exhibit time-invariance or very small variations over time. The present invention relates generally to various methods of "learning" the patterns of backlash-induced positioning error as a function of the various factors contributing to backlash. More specifically, a set of learning-based solutions are employed to mitigate positioning errors due to backlash and the effects of tooth-pitch non-uniformities. Whereas the methods described herein mainly focus on backlash mitigation in timing-belt drive systems, which methods can be generalized with suitable customization and tuning for other drive-train systems such as those using gear trains, chains, lead-screw, etc. The set of solutions described herein may be implemented in software in the form of learning the backlash characteristics of the drive system during a training or calibration phase, and then applying suitable error compensation during normal operation. The schemes described here require no feedback control and can be viewed as feedforward correction based on pre-compensation of the reference (target position). It should be noted that the feedforward compensation of backlash-induced position errors described herein is wholly compatible with feedback control that may be additionally deployed in order to compensate for other time-variant parametric variations as well as any external disturbances.

The backlash mitigation techniques described herein can be understood as comprising two distinct phases: a learning/calibration phase and a compensation phase. During the learning/calibration phase, a suitably large number of motions are executed in a predetermined sequence such that the motion instances span the full range of motion the drive system is designed to be able to execute. The tooth-pitch non-uniformity and backlash-induced errors are measured in situ with the help of sensors built into the drive system. Backlash error as a function of the parameters (e.g., tooth addresses on the belt and pulleys and move lengths) is "learned" using suitable regression functions and methods including, in some embodiments, using suitable machine learning algorithms.

The compensation phase is performed during normal operation of the motion control system, positioning errors due to backlash and tooth-pitch non-uniformities (e.g., belt and pulleys) are computed using the "learned" model from the learning/calibration phase and then compensated for by applying the estimated correction to the target position at the end of the commanded move. The corrections are applied as follows. First, for every move, a correction is applied to the target position based on the estimated positioning error due to tooth-pitch non-uniformities. Second, for every instance of direction-reversal of the motion, correction to the target position of the current commanded (direction-reversed) move is applied to compensate for backlash-induced errors.

FIG. 1 shows a belt-drive system driven by a rotary motor, as may be used in some embodiments. This system is presented herein for the purpose of explaining certain aspects of the present invention, and it should be understood that the techniques described herein are not limited to this specific system. The applicability of this invention spans a wide array of timing-belt driven systems that can include, for example, (a) execution of linear, rotary or other complex motions of the payload, (b) larger drive train with multiple stages and with idlers, (c) linear or rotary drive actuator etc.

In FIG. 1, a Ring Pulley 105 is located on a Payload (Ring) 110. The Ring Pulley 105 is connected by a Timing Belt 115 to a Drive Pulley 120 that is driven by a Stepper Motor 125. The techniques described herein eliminate the need for feedback control of the payload positioning or motion tracking for compensation of backlash-induced positioning error. In some embodiments, sensors are used to measure payload position either during the course of its motion or at the end of the move. Alternatively, as illustrated in FIG. 1, Reference Points 135 on the Payload 110 may be detected using a Home Sensor 130. Reference Points 135 may comprise, for example, indentations, protrusions, or markings on the surface of the Payload 110. Additionally, an Encoder on the Stepper Motor 125 on the drive side records the extent of actuation (e.g., motor rotation).

For the purposes of tracking the address of the teeth on the Timing Belt 115 engaging the Drive Pulley 120 and Ring Pulley 105, the Timing Belt 115 and Pulleys 105, 120 may be selected such that the least common multiple of the teeth on the Timing Belt 115 and Pulleys 105, 120 correspond to integer number of revolutions of the Ring Pulley 105 (e.g., 5 revolutions) as well as integer number of revolutions of the Drive Pulley 120 (e.g., 20 revolutions). For example, the number of teeth on the Drive Pulley 120, Ring Pulley 105, and Timing Belt 115 may be 30, 120, and 150, respectively. For every 5 ring revolutions, an index tooth on the Timing Belt 115 as well as index teeth on the Pulleys 105, 120 return to the same relative configuration with respect to each other. This results in a periodicity of 5 ring revolutions (1 belt cycle). It should be noted that, while this arrangement simplifies tracking the interacting teeth on the timing-belt and the pulleys, it is not a requirement for implementation of the backlash compensation schemes described by the present invention.

It should be noted that FIG. 1 is merely one example of the systems with which the calibration schemes described herein may be used. The calibration schemes can be generalized to various linear and rotary drive systems, belt-drive systems with multiple stages and including idler pulleys, a wide range of actuators (stepper motors, DC servo motors, linear actuator with linear to rotary conversion etc.), wide range of timing belts etc. These schemes can also be extended to other types of transmissions such as those using gear-trains, lead-screw, and chains.

As is generally understood in the art, tooth-pitch varies over the length of timing belts. Similarly, tooth-pitch on the pulleys can exhibit a variation. These variations result in repeatable positioning errors of the load. By tracking the address of the belt teeth engaging with corresponding grooves on the pulleys in the drive train during the operation of the drive system the resulting position error due to the tooth-pitch non-uniformities can be calculated. These errors can then be pre-compensated by suitably modifying the target move lengths as follows:

New target move length=original target move length−error (1)

Figure 2:
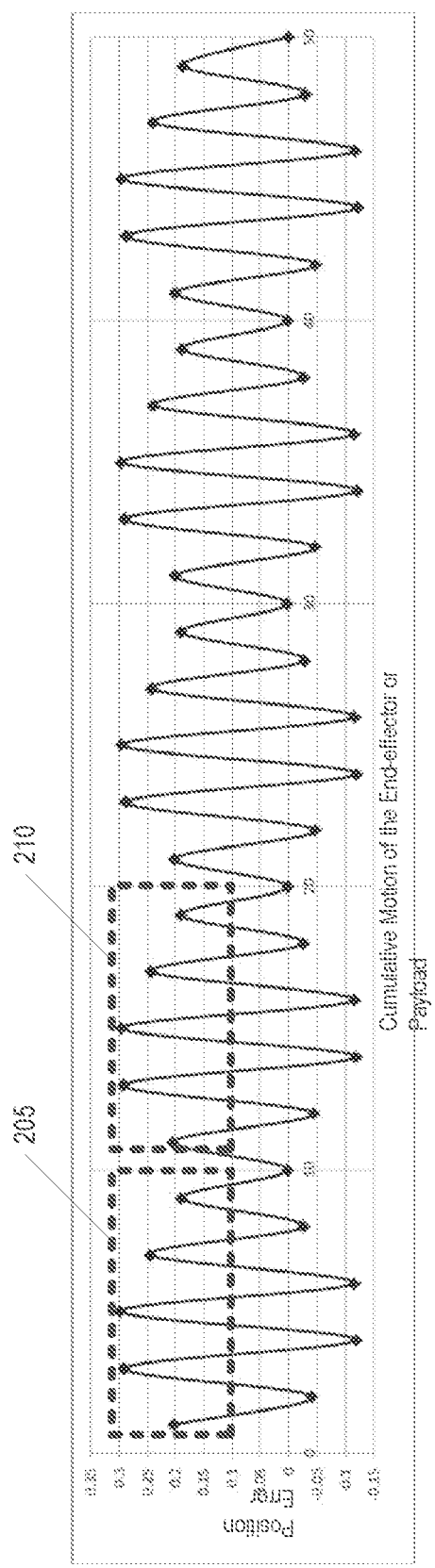
FIG. 2 shows a plot tracking the position of an end-effector.

FIG. 2 shows a plot tracking the position of an end-effector. Each set of moves defined by the dashed line boxes 205, 210 represent one full cycle at the end of which the set of teeth on the belt engaging with the pulleys are the same as the tooth addresses at the beginning of the test.

Figure 3:
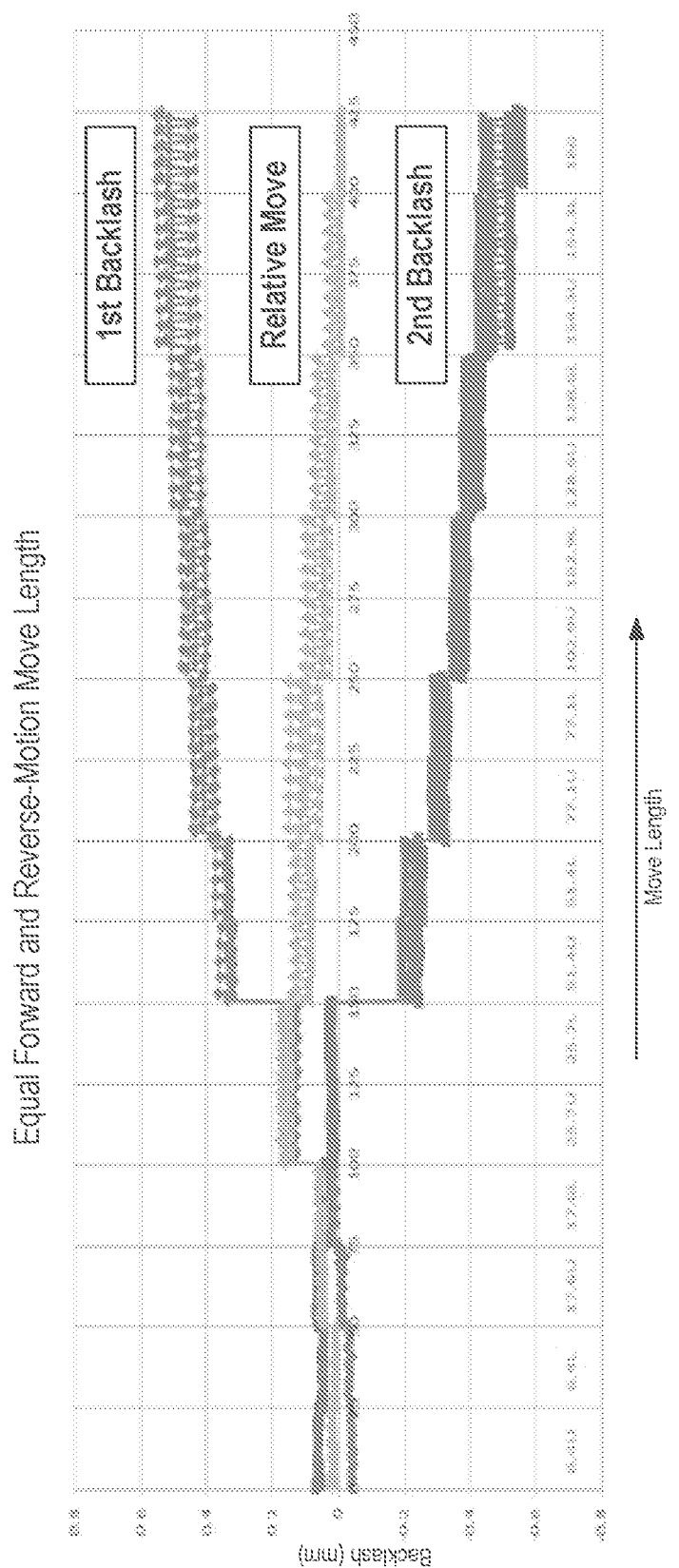
FIG. 3 shows a plot of backlash versus move length.

Studies have shown a strong dependence of backlash on the length of the forward-direction and direction-reversed move for a belt-drive system driving a ring payload. For example, the plot shown in FIG. 3 shows a monotonic increase in backlash with move lengths for the case of equal-sized forward and direction-reversed move pairs. In this example, each forward/reverse move pair is executed starting from the same index locations on the ring-pulley, motor pulley, and belt. In this example, $1^{st}$ backlash denotes backlash during a clockwise-to-counterclockwise direction reversal, $2^{nd}$ backlash denotes backlash during a counter-clockwise-to-clockwise direction reversal, and the central trace is the cumulative or absolute position error. The cumulative/absolute position error in this case varies from zero to a maximum amplitude that depends on the magnitude of belt-pitch non-uniformity.

Figures 4A, 4B:
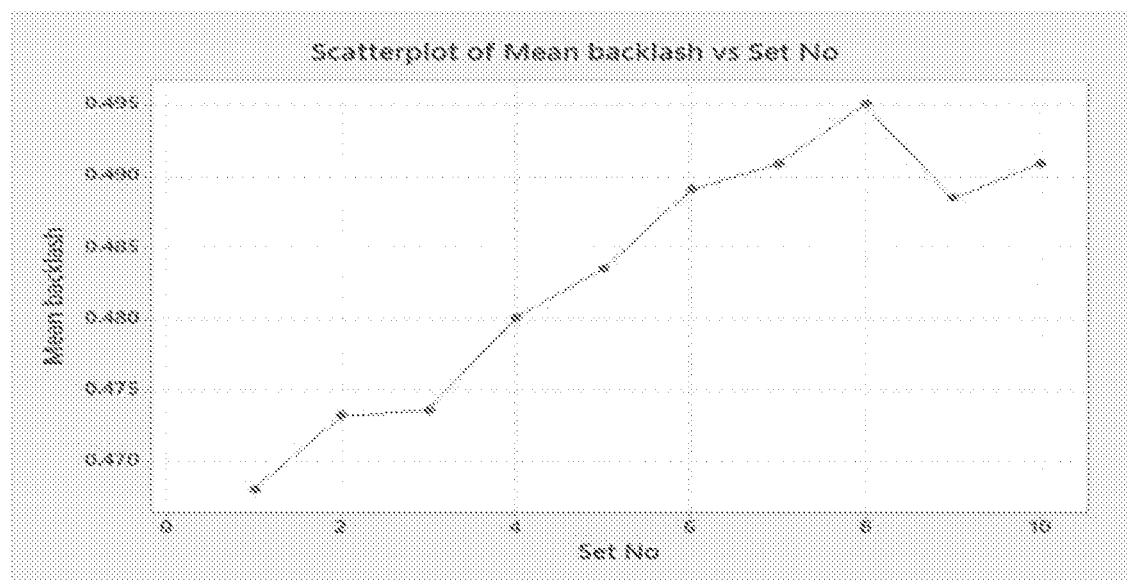
FIG. 4A is a table representing the mean backlash variation over different motion profiles.
FIG. 4B is a scatter plot of mean backlash for the data presented in FIG. 4A.

FIGS. 4A and 4B show how backlash-induced positioning errors propagate for an example study involving a stepper motor-driven belt-drive comprising a timing-belt made of Neoprene and with glass fiber reinforcement of the tensile member. For this example, the following test protocol was used: (1) rotate the ring 360°; (2) perform a clockwise 180° rotation; (3) perform a counter clockwise 180° rotation (backlash 1); (4) perform a counter clockwise 180° rotation; (5) perform a clockwise 180° rotation (backlash 2). This study was made with 180° move length to make the study independent of move length. The 180° move length was chosen because the maximum backlash for symmetric moves was observed for the 180°. In line with earlier studies, this study showed a monotonic increase of backlash with the length of the reverse-direction move. The results of the study of backlash dependence on motion parameters with move length fixed (180°) exhibited little or no dependence of backlash on acceleration, deceleration, associated jerk parameters, and max velocity.

FIG. 4A shows the mean backlash variation over different motion profiles. The first highlighted row (labelled Set No. 3) showed a move-time of approximately 2 seconds, while the second highlighted row (labelled Set No. 8) showed a move-time of approximately 4 seconds. The motion profiles considered here include cases of very slow acceleration and deceleration (2 sec/4 sec move-time) in order to include a wide range of these parameters in examining their potential impact on backlash. FIG. 4B is a plot of mean backlash versus set number. The highlighted motion profile sets in FIG. 4A have extremely low velocities and low acceleration, deceleration, and jerk limits. However, the impact on mean backlash is insignificant. It is to be noted that the methods for backlash compensation disclosed herein are not predicated upon backlash being independent of the motion profile parameters. In the general case, motion profile parameters can additionally be included as variables if backlash exhibits dependence on these parameters.

Figure 5A:
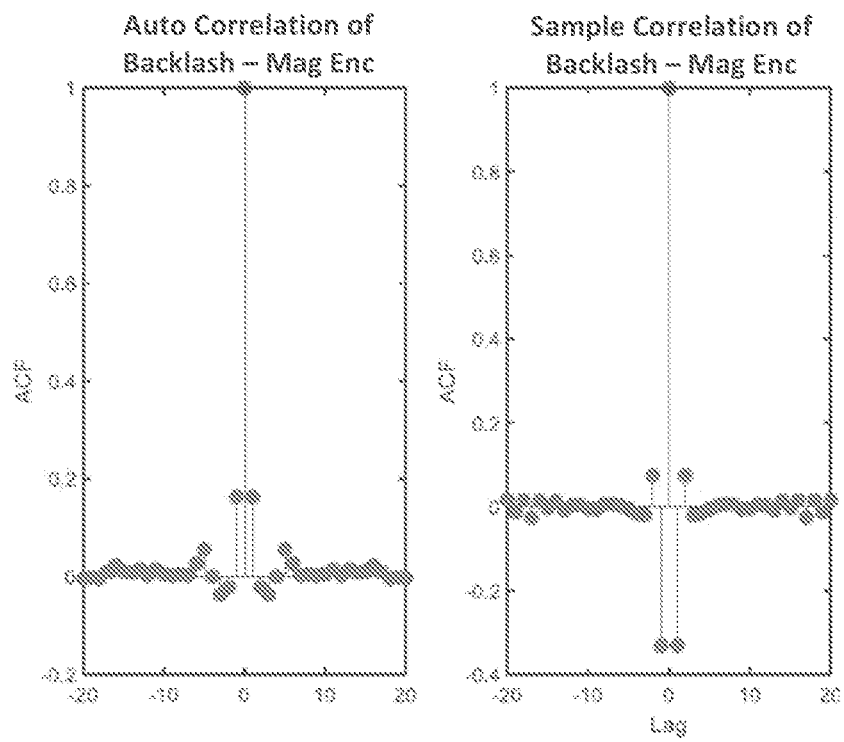
FIG. 5A shows the auto-correlation of backlash magnitude and a comparison to a sample scenario.
Figure 5B:
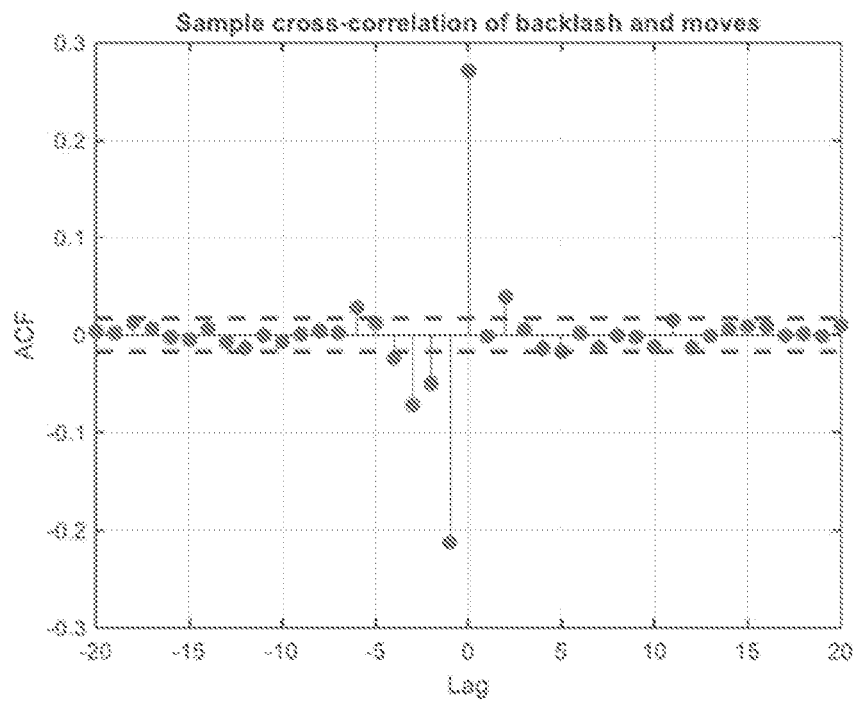
FIG. 5B shows a sample correlation between backlash and prior moves related to the data presented in FIG. 5A.

FIGS. 5A and 5B provide additional results of the study. The left plot shown in FIG. 5A shows the auto-correlation of backlash magnitude demonstrating some dependence on the backlash for the prior direction-reversal move. Correlation with backlash history prior to the previous direction-reversal (shown in the right plot of FIG. 5A) is insignificant. FIG. 5B shows the sample correlation between backlash and the prior moves. This plot shows a dominant dependence on the reverse move length and length of the last move prior to direction-reversal. The move history beyond five prior (forward) moves is observed to be statistically insignificant. In "learning" the variation pattern of backlash for this example application, the backlash for the previous direction-reversal and the move lengths of five moves prior to the current direction-reversal move may be used as "feature variables." It should be noted that the specific dependencies on the history of prior forward-direction moves could in general, vary from one drive system to another. However, the learning-based solutions presented here are generic in scope and can be adapted to any specific drive system design.

Figure 6:
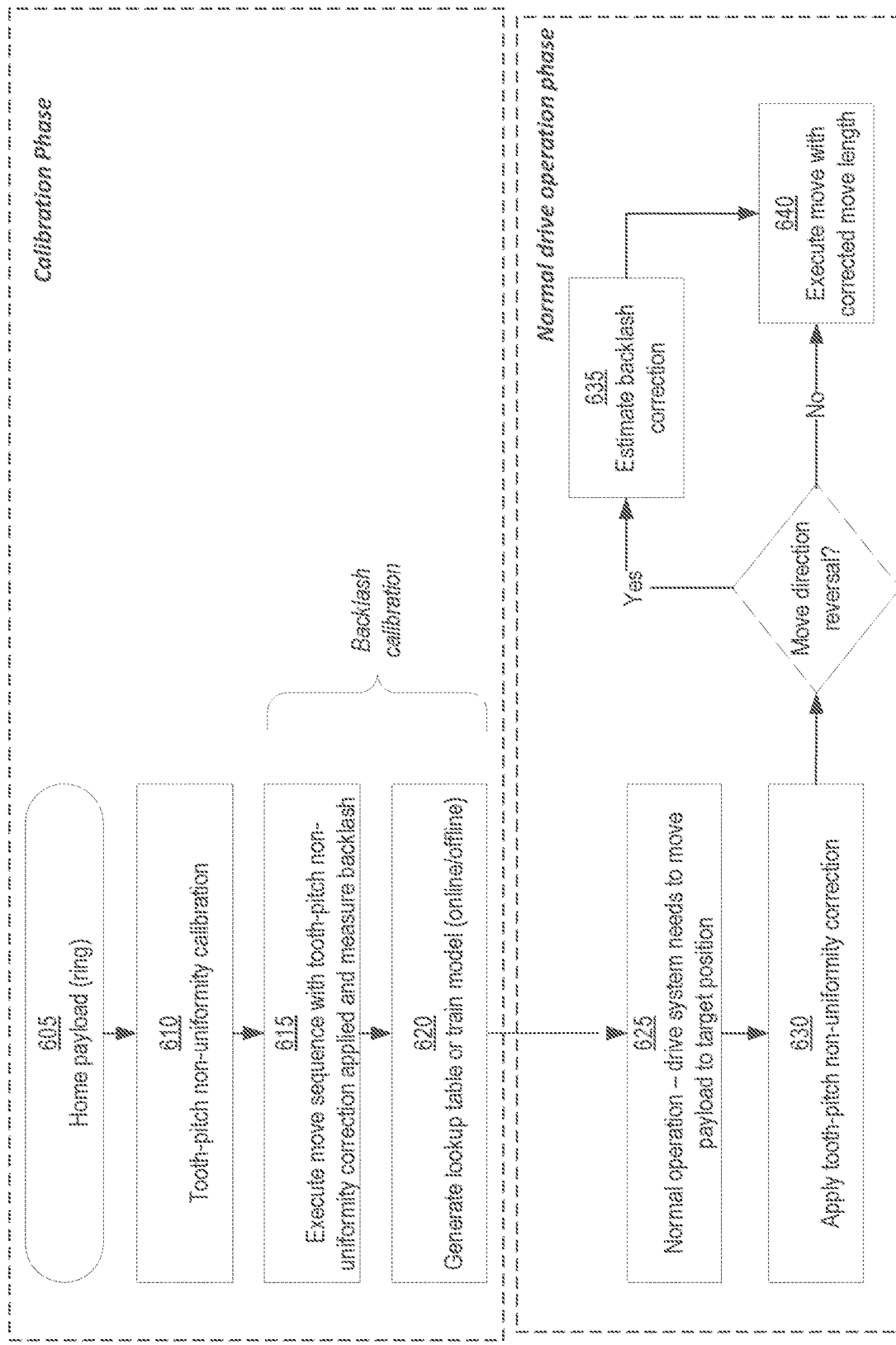
FIG. 6 illustrates, on a high-level, how backlash correction is performed according to some embodiments of the present invention.

FIG. 6 illustrates, on a high-level, how backlash correction is performed according to some embodiments of the present invention. Starting at step 605, the payload (ring) is homed. Homing the payload establishes a reference point on the payload (ring). Homing of the payload can be carried out using a wide variety of sensing methods including, without limitation, capacitive, magnetic, optical methods with suitable homing flags on the payload. Next, at 610, the belt is "homed" by performing a tooth-pitch non-uniformity procedure. This procedure is described in further detail below with reference to FIG. 7. The net result of steps 605 and 610 is to establish a belt/pulley relative configuration for which the belt non-uniformity error is at the minimum. Thereafter, each instance of backlash calibration can be performed from this configuration. During steps 615-620 backlash calibration is performed. At step 615, a move sequence is executed with tooth-pitch non-uniformity correction applied and measure backlash. Then, at 620, a lookup table is generated or a model is trained based on the results.

The bottom portion of FIG. 6 shows the normal drive operation phase where the lookup table or model is applied. During step 625, the system operates as normal and the drive system needs to move the payload to the target position. Tooth-pitch non-uniformity correction is then applied at step 630 in the form of a correction to the target position of the payload. If the move direction reverses, backlash correction is estimated at step 635 and used to execute the move based on the corrected move length at step 640. If move direction has not reversed, step 640 can be performed directly without backlash correction.

In the type of belt-drive system discussed herein, key features affecting backlash include the metrics representing length of the direction-reversed move (current move) and a sub-sequence (five moves in this example) prior to the direction-reversed move. Additional key features that affect backlash include the tooth address (of belt and pulleys) or alternatively, a ring segment index that track the relative configuration of belt teeth engaging with teeth on the pulleys.

Two schemes for backlash error-compensation are discussed herein. The first scheme, referred to herein as "Type 1 Calibration," utilizes look-up tables with simple interpolation of the required backlash error compensation. Type 1 Calibration is described with respect to FIGS. 8-13 below. The second scheme, referred to herein as "Type 2 Calibration," uses machine learning (ML) based algorithms to model and predict backlash pre-compensation of target move length. Type 2 Calibration is also described in further detail below. The creation of the look-up tables or computations of the ML-based backlash calibration can either be carried out on the host instrument or can be performed offline depending on the resources available.

The Type 1 Calibration routine comprises a sufficiently long, systematic sequence of moves. Backlash error is measured using suitable sensors and recorded as a function of the feature variables. The sensing for measuring backlash error could include indirect methods such as sensing of actuator stroke (motor rotation) or belt motion (e.g., features on outside surface of belt). Alternatively, direct methods to sense motion of payload (e.g., magnetic encoder, optical encoder). In cases where backlash variations on multiple drive units are found to exhibit similar patterns (distributions), the calibration could be performed offline based on calibration data from a sufficiently large sample of drive units. The corrections could then be encoded in the form of a common look-up table that is used by all the units.

During normal moves, tooth-pitch non-uniformity correction is first applied and in cases of direction-reversed moves, the backlash map as a function of the feature variables is used to estimate the correction for backlash using a simple table look-up or simple forms of interpolation. The feature-space grid is uniformly sampled with sufficiently fine grid-spacing to accommodate simple look-up table or nearest-neighbor interpolation type of schemes or alternatively, can be chosen to be somewhat coarse and more powerful (e.g., polynomial) interpolation methods used to estimate the required correction. Example interpolation methods that may be used include linear interpolation, nearest-neighbor interpolation, polynomial interpolation, Gaussian Mixture models, Radial Basis Functions, etc.

Figure 7B:
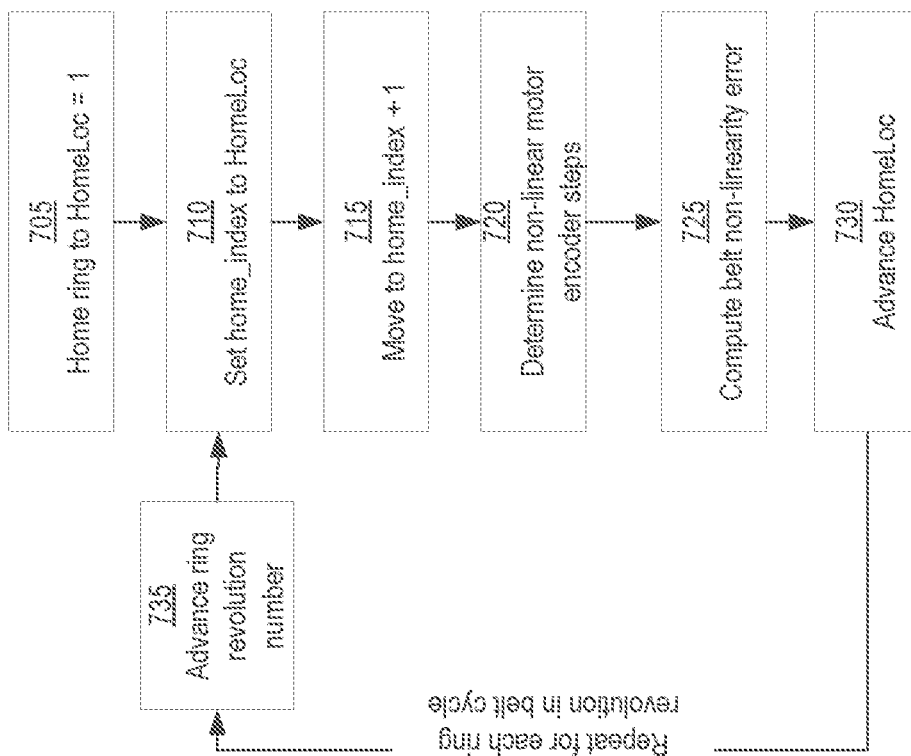
FIG. 7B describes an example belt-pitch non-uniformity and ring index home location calibration scheme that may be applied in some embodiments.
Figure 7A:
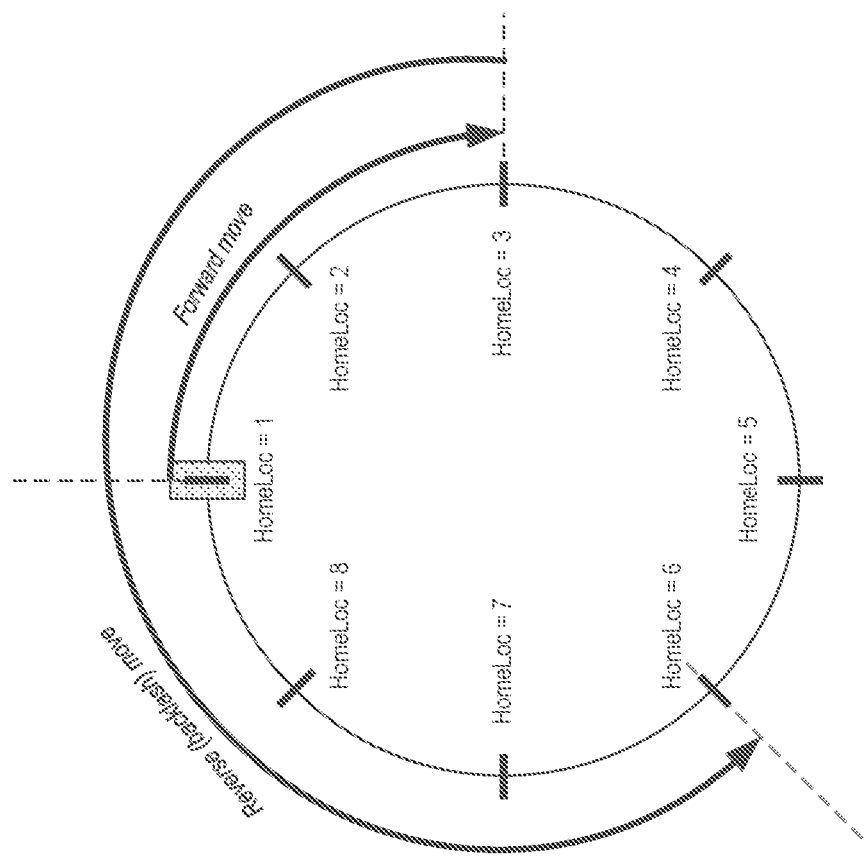
FIG. 7A shows an ring to illustrate one system for performing a first type of backlash calibration (referred to as "Type 1 Calibration"), according to some embodiments.

FIG. 7A shows an example ring to illustrate Type 1 Calibration, according to some embodiments. The Type 1 Calibration scheme assumes a fixed number N of homing locations spaced at $\Delta\theta=360/N$ degree intervals around the ring. In the example of FIG. 7A, N=8. There is a predetermined number of ring revolutions per each belt cycle. Backlash data is stored in a look-up table. For fine calibration, a nearest-neighbor interpolation algorithm is used. Coarse calibration may alternatively be performed using methods such as scattered interpolation algorithm (e.g., linear, cubic, etc.), sparse interpolation methods, robust curve-fitting using Bayesian methods.

FIG. 7B describes an example belt-pitch non-uniformity and ring index home location calibration scheme that may be applied in some embodiments. Starting at step 705, the ring is homed to HomeLoc=1. A loop is then executed at steps 710-735. An index value is set at step 710 and the ring is moved to the location specified by this index+1 at step 715. The 'target' move length in terms of motor encoder counts is computed. The "actual" motor encoder steps are then recorded at step 720 and the belt non-linearity error is computed at step 725 as the difference between the 'target' and 'actual' motor encoder counts. The HomeLoc and ring revolution are advanced at steps 730 and 735, respectively. This loop is repeated for each ring revolution in the belt cycle.

FIGS. 8-13 illustrate various methods of performing a Type 1 Calibration, according to different embodiments of the present invention. For each of these methods, a series of forward moves are stored in a forward move dataset. This forward move dataset is defined as n ($\Delta\theta$), where n=[1, $N_{max}$] and N≤$N_{max}$. A series of reverse moves are stored in a reverse move dataset defined as −n ($\Delta\theta$). It should be noted that the sign of dataset can be reversed in some embodiments. That is, the forward move dataset could be defined as −n ($\Delta\theta$), while the reverse move dataset is defined as n ($\Delta\theta$).

Figure 8:
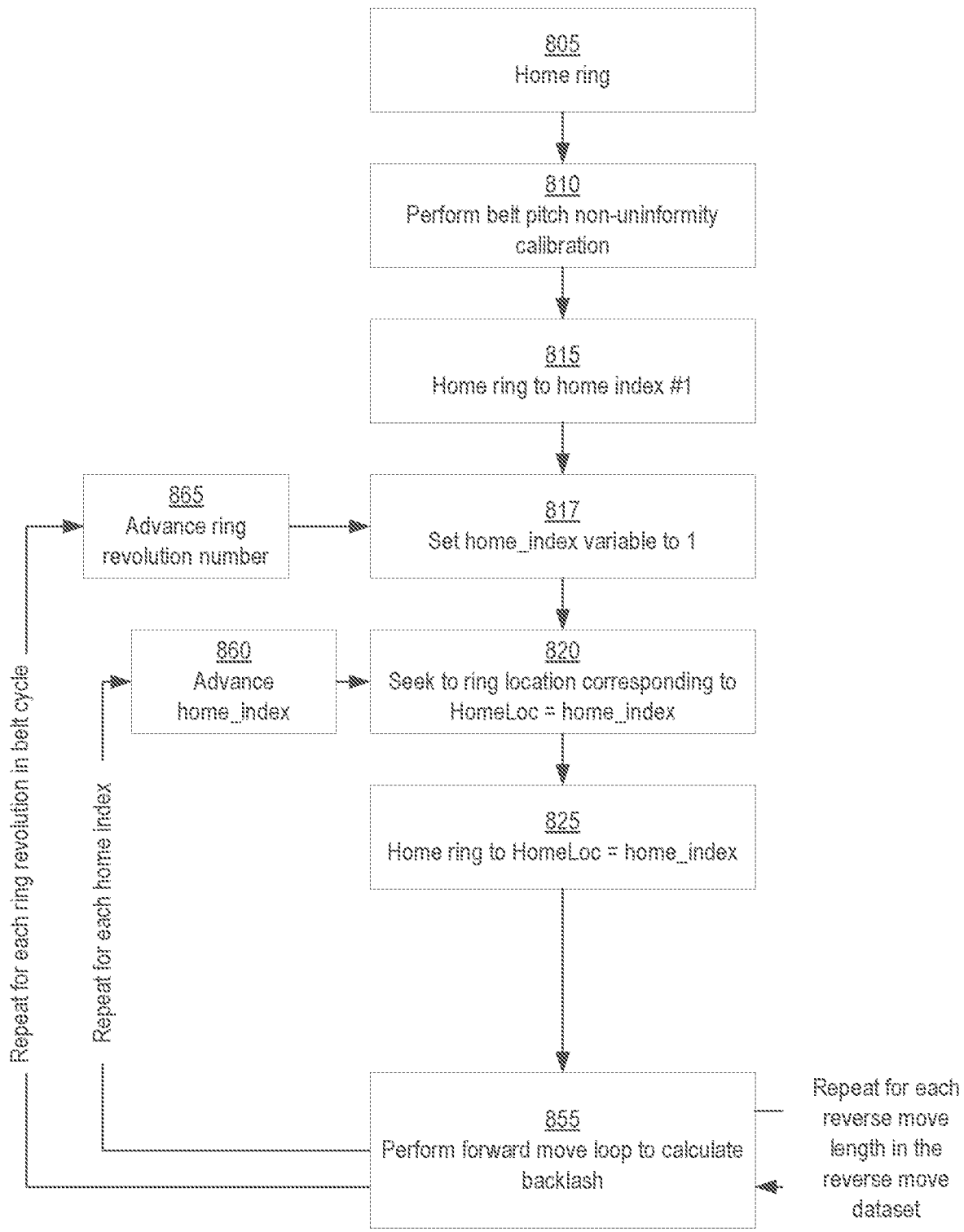
FIG. 8 shows a first example implementation of Type 1 Calibration, according to some embodiments.

FIG. 8 shows a first example implementation of Type 1 Calibration, according to some embodiments. Starting at step 805, the ring is homed to one of the home locations around the ring. A belt-pitch non-uniformity calibration procedure is performed at step 810 (see, e.g., FIG. 7B) and the calculated belt-pitch non-uniformity error is recorded as a function of "Ring Revolution Number" and "HomeLoc" in a variable referred to herein as "nonlin_mtr_encoder_cts." Following belt-pitch non-uniformity calibration, the ring is homed back to home location #1 at step 815. In some embodiments, ring homing could be substituted with homing off the belt (e.g., using notches on top or bottom edge of the belt; using reflectors with optical sensing; using magnetic squares with hall sensing; metallic squares with capacitive sensing; optical beam-based sensing with a reference hole around the mid-section of the belt; etc.).

During steps 817-865 of FIG. 8, a loop is executed for each ring revolution in the belt cycle. The loop starts at 817 by initializing an index variable, referred to herein as the "home_index" to 1. Next, during steps 820-860 an inner loop is executed over all the homing locations around the ring. During step 820, the ring is homed to the location specified by home_index. Then, a forward move loop is performed to calculate backlash at step 855. This forward loop is performed once for each reverse move length in the reverse move dataset. The backlash calculation may be performed in a variety of ways, as described below with reference to FIGS. 9 and 10. After the backlash result has been recorded, the home_index is advanced at step 860 and the loop repeats for each possible homing location. Once backlash has been calculated for all the homing locations, ring revolution number is advanced at step 865 and the outer loop from 817-865 repeats until the loop has been executed for each ring revolution in the belt cycle.

Figure 9:
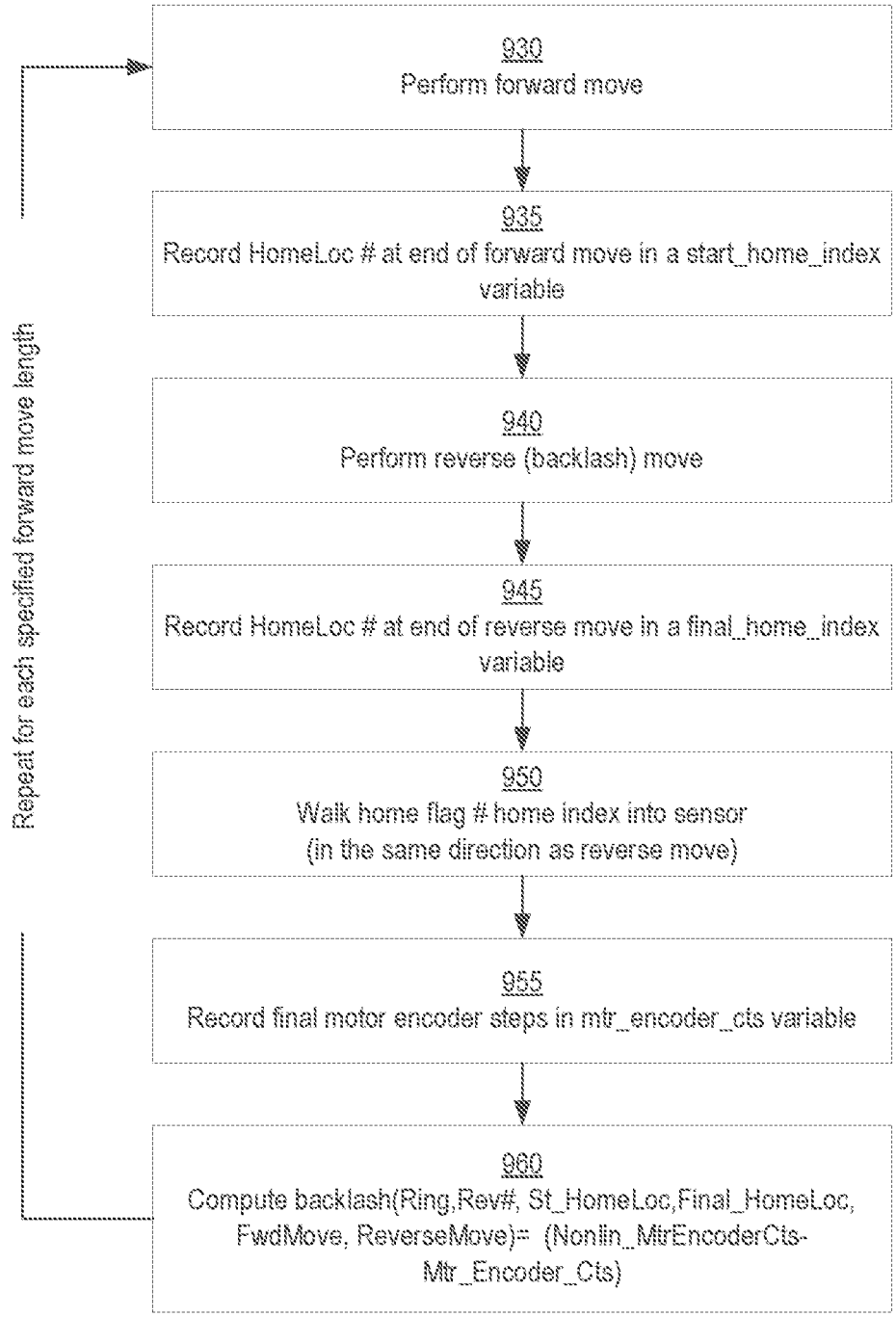
FIG. 9 provides an example of how the backlash calculation can be performed in some embodiments of the present invention.

FIG. 9 provides an example of how the backlash calculation can be performed in some embodiments of the present invention. Starting at step 930, a forward move is executed. Then, at step 935, an index variable (referred to herein as the "start_home_index" variable) is used to record the home location number at the end of the forward move. Next, at step 940, a reverse (i.e., backlash) move is executed. At step 945, an index variable (referred to herein as the "final_home_index" variable) is used to record the home location number at the end of the reverse move. The payload is then homed to the "home_index" location. Then, at step 955 the final motor encoder steps are recorded in a variable, referred to herein as "mtr_encoder_cts" variable. Finally, at step 960 backlash is computed as the difference between the number of target motor encoder steps (i.e., nonlin_mtr_encoder_cts) and the actual motor encoder steps (i.e., mtr_encoder_cts). The backlash value is then stored in a table or other data structure for later retrieval and use during the normal operation phase. For ease of retrieval, one or more indexing values may be associated with the stored backlash value. In the example of FIG. 9, these indexing values are the ring revolution number, the start and final home locations, the number of forward moves, and the number of reverse moves. In the example of FIG. 9, steps 930-960 are executed as a loop, repeating for each specified move length.

Figure 10:
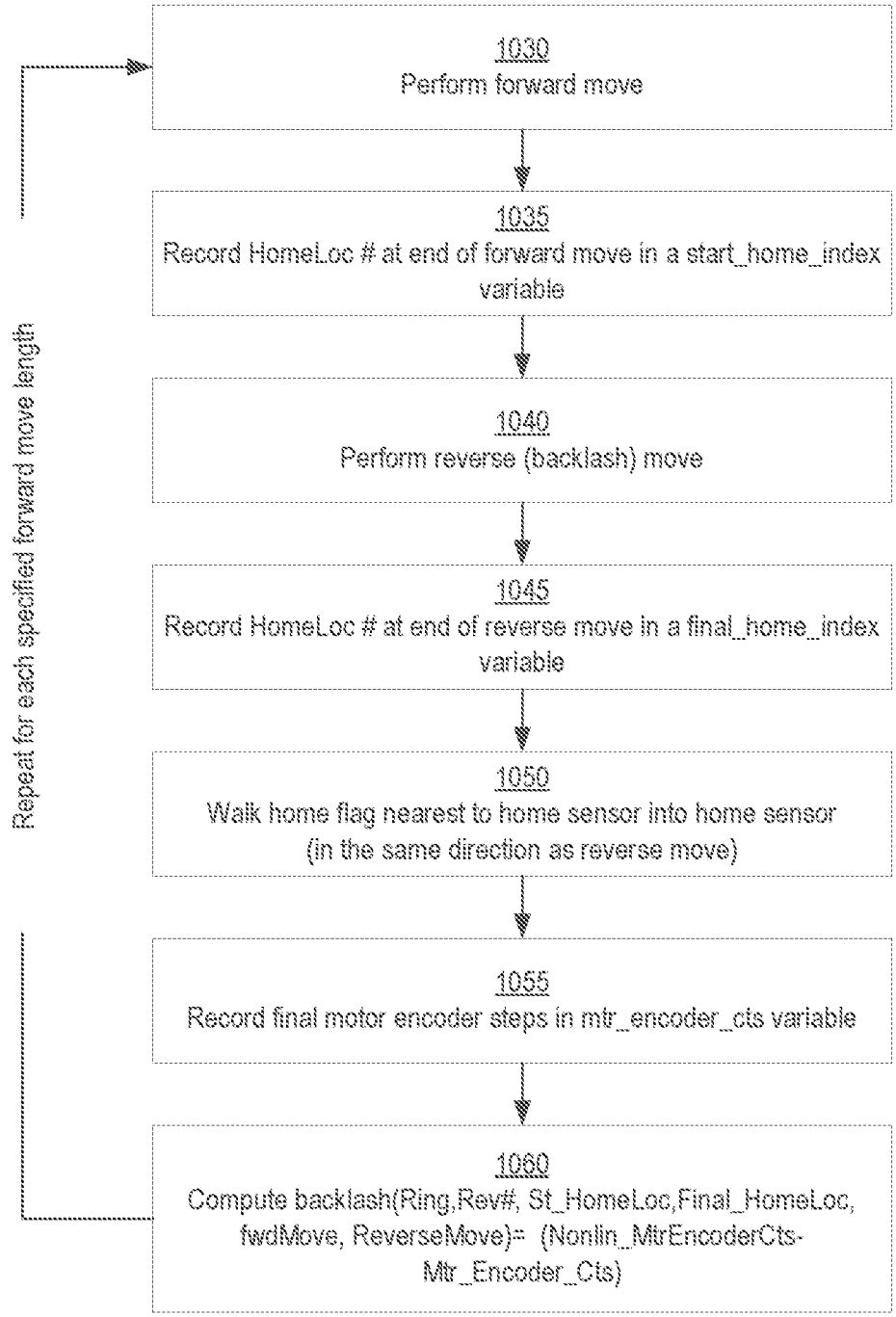
FIG. 10 shows an alternative way the backlash calculation can be performed in some embodiments of the present invention.

FIG. 10 shows an alternative way the backlash calculation can be performed in some embodiments of the present invention. Steps 1030-1045 are performed in a manner similar to steps 930-945 of FIG. 9. In the same way, steps 1050-1060 are executed in a manner similar to steps 950-960 of FIG. 9. However, prior to recording the final motion encoder steps at 1050, the home flag nearest to the home sensor is walked into the home sensor (in the same direction as the reverse move).

Figure 11:
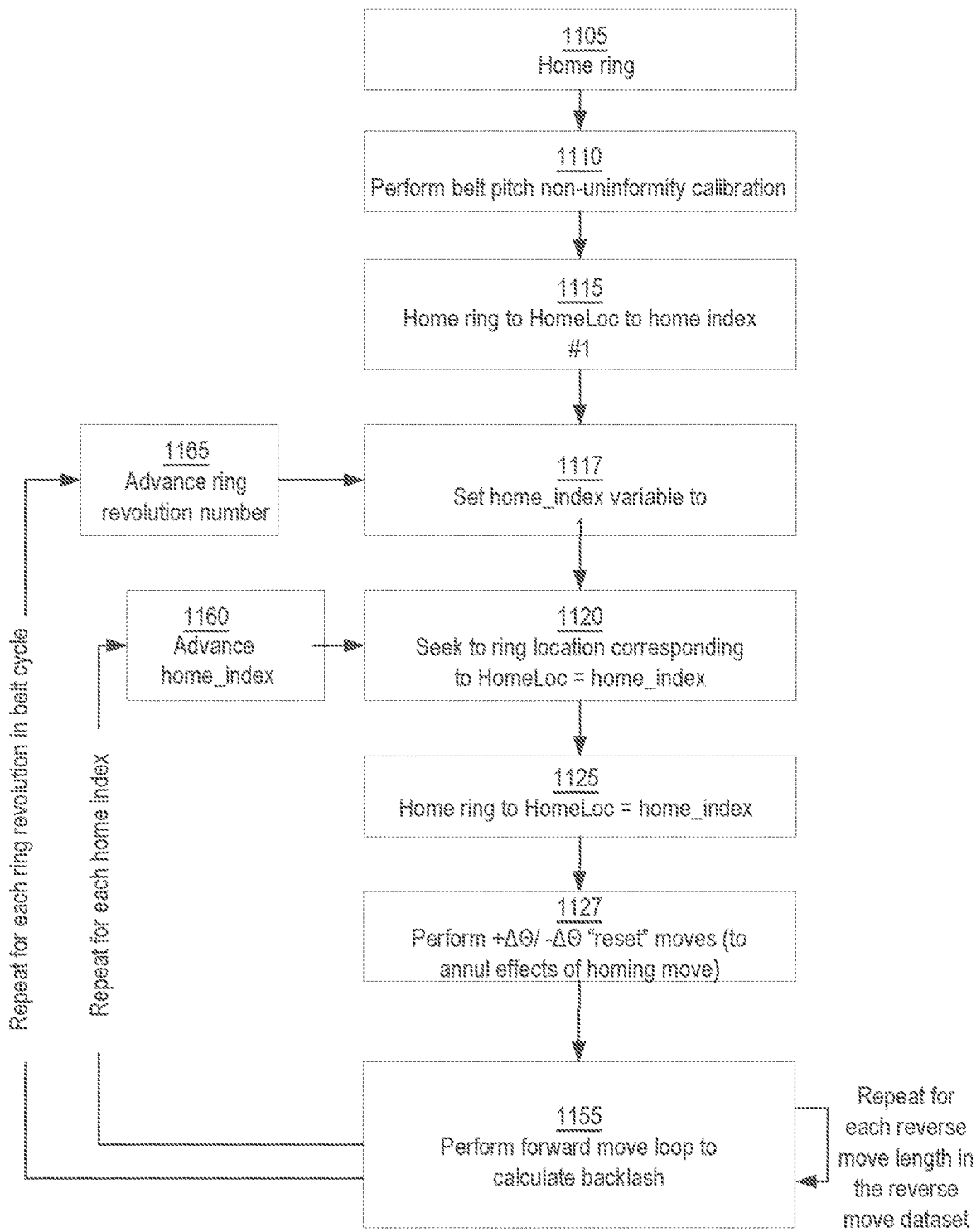
FIG. 11 shows a first alternative methods for performing Type 1 Calibration.
Figure 12:
FIG. 12 shows a second alternative methods for performing Type 1 Calibration.
Figure 13:
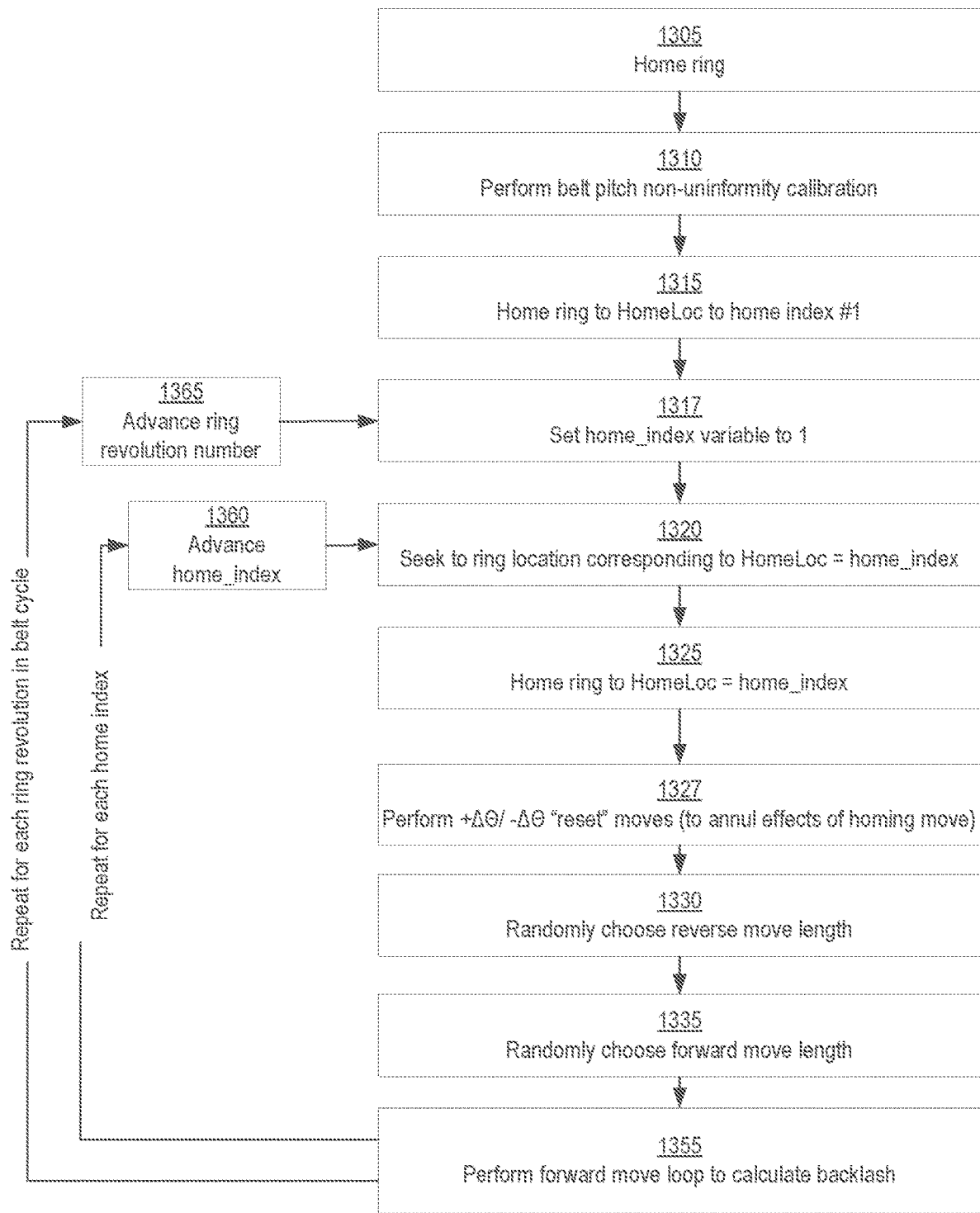
FIG. 13 shows a third alternative methods for performing Type 1 Calibration.

FIGS. 11-13 show alternative methods for performing Type 1 Calibration. These methods may be performed with either of the backlash computation procedures described above with reference to FIGS. 9 and 10.

In the Type 1 Calibration method shown in FIG. 11, steps 1105-1125 are performed in a manner similar to steps 805-825 described above with reference to FIG. 8. However, following step 1125, reset moves are performed at step 1127 to annul the effects of the homing move. These reset moves are performed as $+\Delta\theta$ or $-\Delta\theta$ increments (depending on the orientation used to define forward and reverse movements). The method then continues through steps 1155-1165 in a manner similar to that discussed above with reference to FIG. 8.

In the Type 1 Calibration method shown in FIG. 12, steps 1205-1225 are performed in a manner similar to steps 805-825 described above with reference to FIG. 8. However, rather than looping over the entire reverse and forward move datasets, the forward move loop is only performed for a randomly selected move length. Thus, at steps 1230 and 1235, a random reverse and forward move length is selected. Randomization may be performed using any technique known in the art. Then the forward loop is executed a single time and processing continues through steps 1255-1265 in a manner similar to that discussed above with reference to FIG. 8.

FIG. 13 shows another alternative method for performing Type 1 Calibration, according to some embodiments. This example combines methods shown in FIGS. 13 and 12. Steps 1305-1325 are performed in a manner similar to steps 805-825 described above with reference to FIG. 8. As with FIG. 13, following step 1325, reset moves are performed at step 1327 to annul the effects of the homing move. Then, as with FIG. 12, at steps 1230 and 1235 a random reverse and forward move length are selected at steps at steps 1330 and 1335, respectively. Then the forward loop is executed a single time and processing continues through steps 1360 and 1365 in a manner similar to that discussed above with reference to FIG. 8.

As noted above, the second type of calibration is referred to herein as Type 2 Calibration. Briefly, a backlash model is learned using one or more machine learning (ML) algorithms generally known in the art. The hyperparameters of the selected machine learning scheme can be appropriately chosen through optimization or cross-validation methods. The learned model is then used to estimate the corrections required to compensate for backlash. Type 2 Calibration inherently performs sparse sampling of the feature space grid and hence potentially could achieve calibration more parsimoniously (lesser training time) than Type 1 Calibration.

During model training, the Type 2 Calibration scheme performs a sufficiently large number of randomized bi-directional moves varying in length from the smallest to the largest in terms of number of move segments (1:N). In some embodiments, backlash measurements are performed using (a) direct measurements of payload position (e.g., using a magnetic or optical encoder, laser micrometer, potentiometer etc.). In other embodiments, backlash is computed by homing at multiple equally-spaced (for simplicity) locations on the payload and using an encoder on the drive side to record position. This latter method of sensing requires homing at multiple locations on the ring (assumed for simplicity to be at N points corresponding to the "N" move segments assumed to span the range of move length for the payload). A third set of methods would include homing of reference points on the transmission mechanism (e.g., timing-belt or lead-screw).

The feature variables used for the Type 2 Calibration ML algorithms may include, for example, move lengths of the forward and reverse moves as well as variables representing belt and pulley(s) tooth addresses (or alternatively, payload segment index). For example, the fraction of belt cycle or tooth address on the belt (and pulley(s) if required) can also be tracked. The move length metrics used as feature variables can include the length of current (direction-reversed) move and length of prior (forward) move. Another example of a move metric can be calculated as follows: Previous_backlash_value abs_rev_move Abs_Rev_minus_LastFwd Abs_Rev_minus_SumFwd (abs_rev_move+abs_sum_fwdMove_set) (abs_rev_move+abs_last_fwd_move)Abs_Rev_minus_SumFwd.*abs_rev_move Abs_Rev_minus_MeanFwd.*abs_rev_move Total_AllPrecedingMoves LastFwdMoveLength]. Alternatively, the following move metric can be used: Previous_backlash_value_Previous__5_Fwd_MoveLengths. The meaning of the various variables in this metric are as follows:

| Variable | Definition |
| --- | --- |
| Previous_backlash_value | the backlash error recorded for the prior direction-reversed move instance |
| abs_rev_move | the length of the current direction-reversed move |

-continued

| Variable | Definition |
|---|---|
| Abs_Rev_minus_LastFwd | the magnitude of difference in length of the current direction-reversed move and the prior ('forward' direction) move |
| Abs_Rev_minus_SumFwd | the magnitude of difference between the length of the current (direction-reversed) move and the sum of the 'forward' move lengths between the current and prior direction-reversal instances |
| (abs_rev_move + abs_sum_fwdMove_set) | the sum of the length of the current (direction-reversed) move and the sum of lengths of the 'forward' moves between the current and prior direction-reversal instances |
| (abs_rev_move + abs_last_fwd_move) | the sum of the lengths of the current (direction-reversed) move and the prior 'forward' move |
| Abs_Rev_minus_MeanFwd | the absolute difference between the length of the current (direction-reversed) move and the average length of 'forward' moves between the current and prior direction-reversal instances |
| Total_AllPrecedingMoves | the algebraic sum of all the moves prior to the current (direction-reversed) move |
| LastFwdMoveLength | the length of the move ('forward') prior to the current (direction-reversed) move |

As an additional feature variable, the payload (ring) can be virtually segmented into "N" equal parts. The ring "segments" may then be used as a proxy for tracking the addresses of teeth on the belt and pulleys. The ring segment number then spans from 1 to N* the number of ring revolutions per belt cycle.

If additional factors such as maximum or average acceleration/deceleration during the moves are found to affect backlash depending on the choice of timing belt, drive-systems design, type of end application etc., the calibration schemes discussed herein can still be applied by suitable expansion of the feature space to include the additional factors along with obvious generalizations and suitable selection of the calibration scheme.

The feature variables of interest can suitably be chosen for each application by performing feature selection using methods such as for instance, "Predictor Importance" estimates using Decision Trees.

The ML algorithms utilized in the Type 2 Calibration scheme may be selected, for example, based on characteristics such as the prediction performance of the algorithm, the associated computational complexity, and the ease of implementation. Example ML algorithms include linear regression (with regularization if required), neural networks, decision tree-based regression, multinomial logistic regression, autoregressive—moving-average model with exogenous inputs ("ARMAX") models, random forest regression trees, linear support vector machines, deep learning models, etc. Techniques for implementing these algorithms are generally known in the art and, thus these algorithms are not described in full detail herein.

Recalibration using either the Type 1 or Type 2 calibration scheme can be performed at regular service intervals to gage change in the performance of the drive unit. Any statistically significant change could then be used as fault prediction and/or to schedule preventive maintenance. In the event of the instrument being powered off and the calibration data not available any more in Random Access Memory, a recalibration can be eschewed by always carrying out backlash calibration after homing the belt such that say, the initial configuration of the belt-drive system at the start of backlash calibration corresponds to a minima of the tooth-pitch non-uniformity error. This would require storing the backlash calibration data (based on prior belt-homing) in non-volatile memory.

Figure 14:
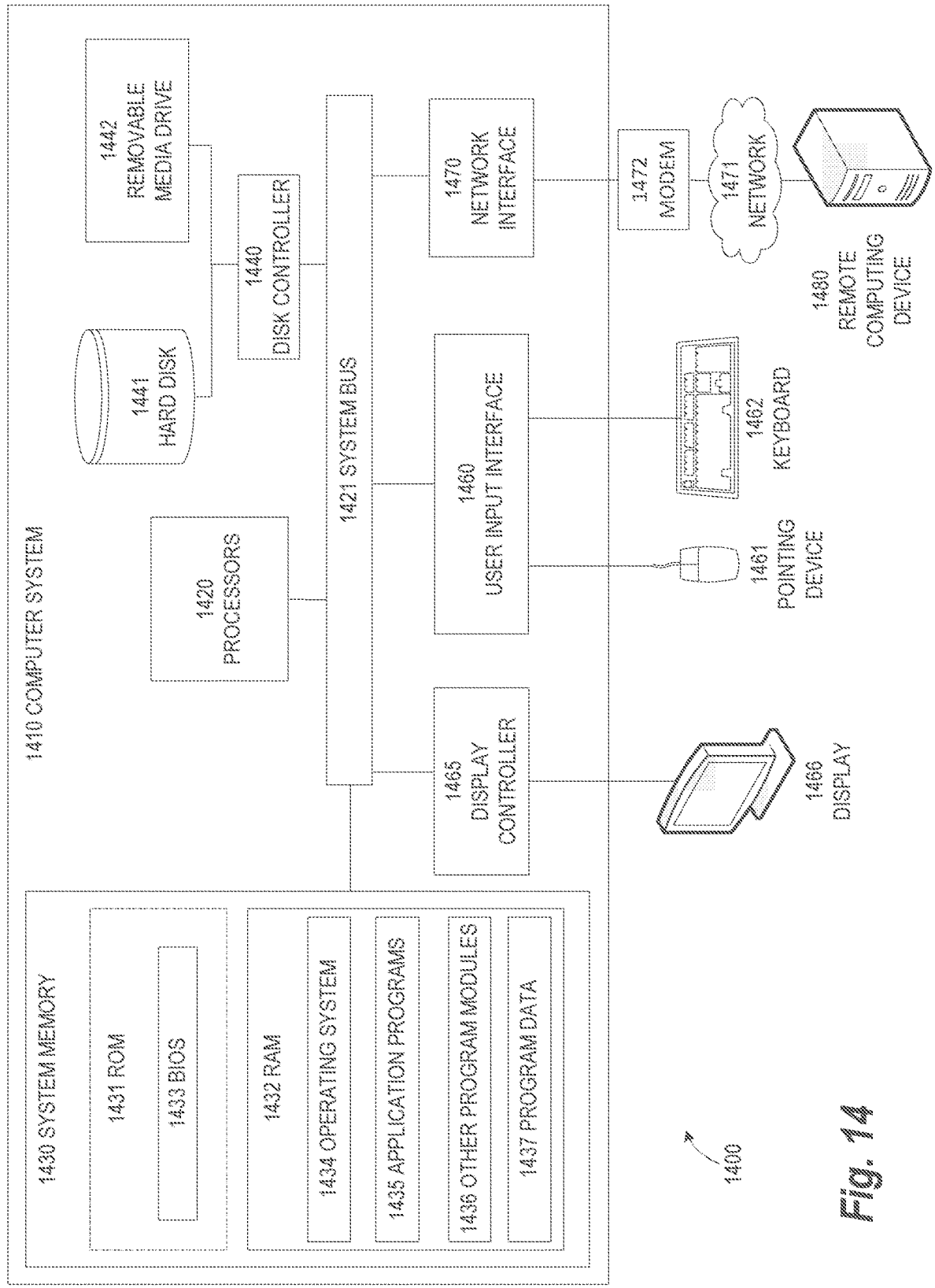
FIG. 14 illustrates an exemplary computing environment within which embodiments of the invention may be implemented.

FIG. 14 illustrates an exemplary computing environment 1400 within which embodiments of the invention may be implemented. For example, this in some embodiments, the computing environment 1400 may be used to support calibration of the belt-drive system driven shown in FIG. 1. The computing environment 1400 may include computer system 1410, which is one example of a computing system upon which embodiments of the invention may be implemented. Computers and computing environments, such as computer system 1410 and computing environment 1400, are known to those of skill in the art and thus are described briefly here.

As shown in FIG. 14, the computer system 1410 may include a communication mechanism such as a bus 1421 or other communication mechanism for communicating information within the computer system 1410. The computer system 1410 further includes one or more processors 1420 coupled with the bus 1421 for processing the information. The processors 1420 may include one or more central processing units (CPUs), graphical processing units (GPUs), or any other processor known in the art.

The computer system 1410 also includes a system memory 1430 coupled to the bus 1421 for storing information and instructions to be executed by processors 1420. The system memory 1430 may include computer readable storage media in the form of volatile and/or nonvolatile memory, such as read only memory (ROM) 1431 and/or random access memory (RAM) 1432. The system memory RAM 1432 may include other dynamic storage device(s) (e.g., dynamic RAM, static RAM, and synchronous DRAM). The system memory ROM 1431 may include other static storage device(s) (e.g., programmable ROM, erasable PROM, and electrically erasable PROM). In addition, the system memory 1430 may be used for storing temporary variables or other intermediate information during the execution of instructions by the processors 1420. A basic input/output system (BIOS) 1433 containing the basic routines that help to transfer information between elements within computer system 1410, such as during start-up, may be stored in ROM 1431. RAM 1432 may contain data and/or program modules that are immediately accessible to and/or presently being operated on by the processors 1420. System memory 1430 may additionally include, for example, operating system 1434, application programs 1435, other program modules 1436 and program data 1437.

The computer system 1410 also includes a disk controller 1440 coupled to the bus 1421 to control one or more storage devices for storing information and instructions, such as a hard disk 1441 and a removable media drive 1442 (e.g., floppy disk drive, compact disc drive, tape drive, and/or solid state drive). The storage devices may be added to the computer system 1410 using an appropriate device interface (e.g., a small computer system interface (SCSI), integrated device electronics (IDE), Universal Serial Bus (USB), or FireWire).

The computer system 1410 may also include a display controller 1465 coupled to the bus 1421 to control a display 1466, such as a cathode ray tube (CRT) or liquid crystal display (LCD), for displaying information to a computer user. The computer system includes an input interface 1460 and one or more input devices, such as a keyboard 1462 and a pointing device 1461, for interacting with a computer user and providing information to the processor 1420. The pointing device 1461, for example, may be a mouse, a trackball, or a pointing stick for communicating direction information and command selections to the processor 1420 and for controlling cursor movement on the display 1466. The display 1466 may provide a touch screen interface which allows input to supplement or replace the communication of direction information and command selections by the pointing device 1461.

The computer system 1410 may perform a portion or all of the processing steps of embodiments of the invention in response to the processors 1420 executing one or more sequences of one or more instructions contained in a memory, such as the system memory 1430. Such instructions may be read into the system memory 1430 from another computer readable medium, such as a hard disk 1441 or a removable media drive 1442. The hard disk 1441 may contain one or more datastores and data files used by embodiments of the present invention. Datastore contents and data files may be encrypted to improve security. The processors 1420 may also be employed in a multi-processing arrangement to execute the one or more sequences of instructions contained in system memory 1430. In alternative embodiments, hard-wired circuitry may be used in place of or in combination with software instructions. Thus, embodiments are not limited to any specific combination of hardware circuitry and software.

As stated above, the computer system 1410 may include at least one computer readable medium or memory for holding instructions programmed according to embodiments of the invention and for containing data structures, tables, records, or other data described herein. The term "computer readable medium" as used herein refers to any medium that participates in providing instructions to the processor 1420 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1441 or removable media drive 1442. Non-limiting examples of volatile media include dynamic memory, such as system memory 1430. Non-limiting examples of transmission media include coaxial cables, copper wire, and fiber optics, including the wires that make up the bus 1421. Transmission media may also take the form of acoustic or light waves, such as those generated during radio wave and infrared data communications.

The computing environment 1400 may further include the computer system 1410 operating in a networked environment using logical connections to one or more remote computers, such as remote computer 1480. Remote computer 1480 may be a personal computer (laptop or desktop), a mobile device, a server, a router, a network PC, a peer device or other common network node, and typically includes many or all of the elements described above relative to computer system 1410. When used in a networking environment, computer system 1410 may include modem 1472 for establishing communications over a network 1471, such as the Internet. Modem 1472 may be connected to bus 1421 via user network interface 1470, or via another appropriate mechanism.

Network 1471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1410 and other computers (e.g., remote computer 1480). The network 1471 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1471.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A method for backlash compensation in motion control systems, the method comprising:
   homing a payload of a motion control system;
   performing a tooth-pitch non-uniformity procedure on the motion control system to identify a non-uniformity correction;
   generating a backlash lookup table for use in backlash correction during normal operation of the motion control system, wherein the backlash lookup table is generated using a training process comprising:
      selecting a move sequence for operating the motion control system,
      executing the move sequence with the non-uniformity correction,
      computing a backlash measurement describing backlash of one or more components of the motion control system during the move sequence, and
      storing the backlash measurement in the backlash lookup table.

2. The method of claim 1, wherein the motion control system is a linear drive system.

3. The method of claim 1, wherein:
   the payload is a ring comprising a plurality of homing locations equally spaced around round the ring and
   the motion control system comprises a home sensor for tracking the plurality of homing locations during movement of the motion control system.

4. The method of claim 3, wherein the backlash measurement is computed using a calibration process executed once for each ring revolution number within a belt cycle corresponding to the movement of the ring, wherein the calibration process comprises:
   moving the ring to a homing location;
   executing a reverse move loop for each of one or more reverse move lengths;
   executing a forward move loop within the reverse move loop, wherein the forward move loop is executed for each of one or more forward move lengths and the forward move loop comprises:
      performing a forward move for a current forward move length;
      performing a reverse move for a current reverse move length;
      recording an actual motor encoder step count resulting from the forward move and reverse move;
      computing the backlash measurement as the difference between a target motor encoder step count corresponding to the non-uniformity correction and the actual motor encoder step count.

5. The method of claim 4, wherein each iteration of the calibration process comprises:
   recording the homing location at the end of the forward move as a start home location;
   recording the homing location at the end of the reverse move as an end home location,
   wherein the backlash measurement is stored in the backlash lookup table indexed by a current ring revolution number, the start home location, the end home location, current forward move length, and the current reverse move length.

6. The method of claim 4, wherein the reverse move loop within the calibration process is executed once for each homing location on the ring and the method comprises:
   prior to recording the motor encoder step count, walking a current homing location into the home sensor in the same direction as the reverse move.

7. The method of claim 4, wherein the reverse move loop within the calibration process is executed once for each homing location on the ring and the method comprises:
   prior to recording the motor encoder step count, walking a homing location closest to sensor into the home sensor in the same direction as the reverse move.

8. The method of claim 4, further comprising:
   prior to executing the calibration process, homing the ring to an initial homing location.

9. The method of claim 8, further comprising:
   executing one or more reset moves to annul effects of homing the ring to the initial homing location, wherein each rest move has a length of 360 divided the number of homing locations on the ring.

10. The method of claim 4, wherein the reverse move length and the forward move length used for executing the calibration process are each randomly selected.

11. The method of claim 4, wherein the calibration process is executed during startup of the motion control system.

12. The method of claim 4, wherein the calibration process is performed at predetermined scheduled intervals.

13. The method of claim 1, wherein the motion control system further comprises a ring pulley connected to a timing belt to a drive pulley that is driven by a stepper motor.

14. The method of claim 1, further comprising:
   during normal operation of the motion control system, performing a correction process comprising:
   applying the non-uniformity correction;
   receiving a request to execute a new move sequence;
   if the new move sequence includes a direction reversal, estimate a new backlash correction using the backlash lookup table and apply the new backlash correction to the new move sequence; and
   executing the new move sequence.

15. The method of claim 14, wherein the new backlash correction is estimated by interpolating between a plurality of backlash measurements in the backlash lookup table.

16. The method of claim 1, wherein the backlash measurement is computed based on one or more features detected on an outside surface of a transmission element driving the payload or based on one or more features on the payload that can be sensed.

17. The method of claim 1, wherein the backlash measurement is computed based on stroke of an actuator driving the payload.

18. A method for backlash compensation in motion control systems, the method comprising:
 homing a payload of a motion control system;
 performing a tooth-pitch non-uniformity procedure on the motion control system to identify a non-uniformity correction;
 generating a plurality of backlash measurements corresponding to a plurality of move sequences, wherein each backlash measurement is computed using a process comprising:
  selecting a move sequence for operating the motion control system,
  executing the move sequence with the non-uniformity correction,
  computing a backlash measurement describing backlash of one or more components of the motion control system during the move sequence, and
  storing the backlash measurement and the move sequence; and
 training a machine learning model for use in backlash correction using the plurality of backlash measurements and the plurality of move sequences.

19. The method of claim 18, wherein:
 the payload is a ring comprising a plurality of homing locations equally spaced around round the ring, and
 the backlash of the one or more components of the motion control system is tracked using the homing locations.

20. The method of claim 18, further comprising:
 during normal operation of the motion control system, performing a correction process comprising:
  applying the non-uniformity correction;
  receiving a request to execute a new move sequence;
  if the new move sequence includes a direction reversal, estimate backlash correction using the machine learning model and apply the backlash correction to the new move sequence;
  executing the new move sequence.

21. A method for backlash compensation in motion control systems, the method comprising:
 during normal operation of a motion control system, performing a correction process comprising:
  receiving a request to execute a new move sequence;
  if the new move sequence includes a direction reversal for the motion control system, estimate a new backlash correction using a backlash lookup table and apply the new backlash correction to the new move sequence; and
  executing the new move sequence.

22. A method for backlash compensation in motion control systems, the method comprising:
 during normal operation of a motion control system, performing a correction process comprising:
  receiving a request to execute a new move sequence;
  if the new move sequence includes a direction reversal for the motion control system, estimate a new backlash correction using a machine learning model and apply the new backlash correction to the new move sequence; and
  executing the new move sequence,
 wherein the machine learning model is trained using by measuring backlash of the motion control system when executing a training sequence of moves.

* * * * *